May 16, 1961

W. WYSOCKI 2,984,214

ELECTRIC SPEED GOVERNOR WITH DIRECT CONTROL
OF THE SPEED TO BE GOVERNED

Filed Nov. 24, 1958

Inventor.
Wacław Wysocki
By: [signature]
Attorney

United States Patent Office 2,984,214
Patented May 16, 1961

1

2,984,214

ELECTRIC SPEED GOVERNOR WITH DIRECT CONTROL OF THE SPEED TO BE GOVERNED

Waclaw Wysocki, Milan, Italy, assignor to Costruzioni Meccaniche Riva S.p.A., Milan, Italy, a company of Italy Filed Nov. 24, 1958, Ser. No. 775,821

Claims priority, application Italy Dec. 21, 1957

7 Claims. (Cl. 121—41)

The invention relates to an electric speed governor sensitive to electric governing signals for controlling a sytem to be governed through a mechanical power member, such as for instance a hydraulic servomotor.

This governor according to the invention is subtantially characterized in that the governed speed is controlled directly by a generating device which is connected to the output of said power member to achieve displacements proportional to those of the power member, and to generate a voltage of amplitude proportional at every instant to the speed of displacement of the power member, and prefixed by a sign relative to the direction of that displacement, the voltage so generated being applied to the input of the governor in such a manner as to oppose, during transients, the displacements of the power member as caused by the electric governing signals. The electric signals to which the governor is sensitive, are proportional to predetermined magnitude of governing such as frequency, acceleration, power, phase, level, range, etc.

In the following description particular reference is made to a speed governor of accelerotachymetric type for hydraulic turbines, however without limitation thereto or to the general scope of the present invention.

The advantages of accelerotachymetric governing are well-known and fully recognized in the literature; and it is well-known as well that there are limits up to which it is possible to push the accelerometric action while beyond them the danger of instability is encountered.

It is also known that to increase the efficiency of an electric accelerotachymetric speed governor, the attempt was made to apply an electric device of transient statism the operating principle of which is analogous to that of the electric or hydraulic devices already employed with tachymetric governors and called "damping member," "yielding interlinking" etc.

All those devices, even if of different construction, have in common that they are constituted of passive elements which accumulate energy during the period in which the sensitive member attempts to correct the error, then return said energy with a certain time constant, for which the device is calibrated.

Although those devices display an action tending to damp the displacements of the servomotor, it is not an actual and direct control of the speed to be governed, first of all because the action of those devices is not in correlation at all times with the speed of displacement of the servomotor.

The question can be better understood if it is discussed with reference to one of the already known electric governors, in which a similar device is connected to the output of the servomotor. Therein, firstly a signal proportional to the position of the servomotor is taken up, for example by a potentiometer whose brush is connected to the rod of said servomotor, then the signal passes through a power factor correcting resistance and capacity circuit, where its power factor is improved so that at the output there appears a voltage which within certain limits may be considered proportional to the speed of displacement of the servomotor. It returns to the input of the governor with such a sign as to delay the movement of the servomotor.

The device is constituted by passive elements, as mentioned above, hence there is an accumulation of reactive energy which produces transients foreign to the magnitude measured, which is in this case the speed of displacements of the servomotor. In practice the use of that device is equivalent to an introduction, into the governing ring, of a reactive element which moreover has a time constant of its own.

The effect attained is similar to that obtained in many other electric devices in which in the circuit of negative feedback there is connected a stabilising reactive element; the influence is small if its value is low as compared with the "optimum" value as determined by the characteristics of the whole, while it may cause instability if said value is too high.

The same happens also in this case; the device should be separately calibrated for every operating condition of the equipment and, moreover, its action should be contained within modest limits.

Bearing in mind that the accelerometer is a power factor correcting device, in the case of the combination of the accelerometer with a device of transient statism, there might arise instability problems with said governor and limitations in the possibility of separate line-up of those two elements. So far, the practical use of a governor of that kind has not been known.

On the other hand it is known that in order to better utilize the advantages of accelerometric governing it is convenient to have available an effective and direct control of the speed of displacement of the servomotor. The governor according to the present invention ensures such governing characteristics as to render possible the maximum effectiveness of the acelerometer, and the direct control of the speed of the servomotor avoids at the same time the inconveniences above described and coming from the use of a "transient statism." This has been attained, according to the invention, in that in the electric governor, whose tachymetric and accelerometric part may be known per se, the generating device connected to the output of the servomotor is free from reactive passive components and, therefore, it does not introduce, into the governing circuits, any elements which by themselves might bring about instability. In that way it is possible to utilize in an effective manner a signal proportional really and only to the speed of displacement of the servomotor, which in turn makes it possible to push the acceleometric action up to limits considerably higher than those normally admitted. Hence there are attained stability characteristics not to be attained otherwise.

A generating device of that kind which may be advantageously employed with the governor according to the present invention is for instance the one disclosed in my co-pending patent application bearing Serial No. 781,178.

The invention will be more fully understood from the following description of an embodiment thereof as well as of the more general description appended thereto hereinafter, merely by way of example and with reference to the accompanying drawings wherein.

Figure 1:
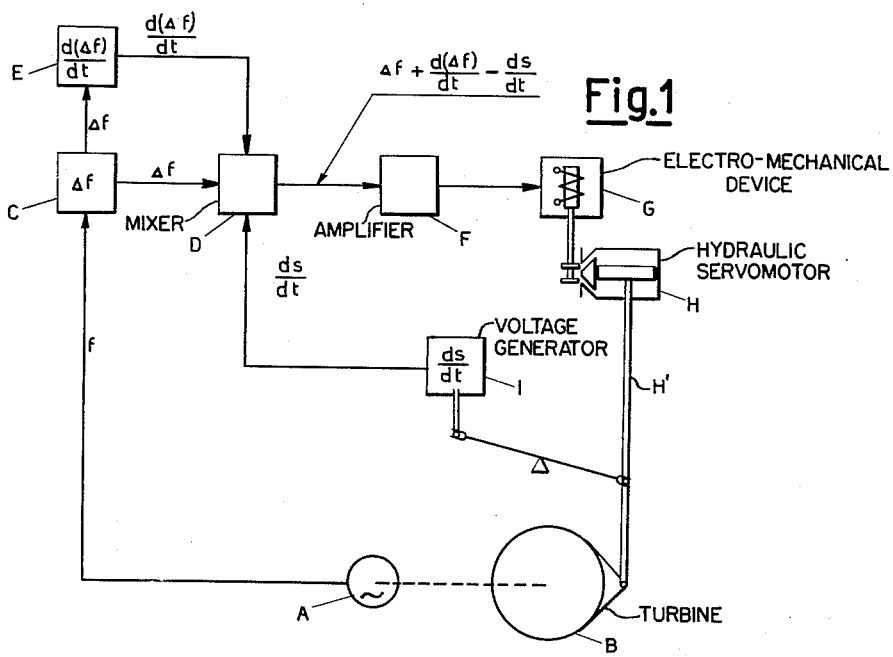
Fig. 1 represents diagrammatically, by a block-diagram, a practical embodiment of the invention.

As indicated in Fig. 1, a single-phase alternate current tachymetric generator A coaxial with the hydraulic turbine B, generates a voltage the frequency of which is proportional to the speed of rotation of the group.

The signal of frequency $f$ coming from the generator A reaches an electric device C at the output terminals whereof there appears a signal $\Delta f$ of amplitude proportional to the difference between the frequency $f$ and a predetermined frequency.

The signal $\Delta f$ enters directly a mixer D and moreover is fed to the input of an accelerometric device E which supplies the mixer D with the signal of amplitude proportional to the derivative $$\frac{d(\Delta f)}{dt}$$

which represents the speed with which the group changes the conditions of rotation.

The sum of said signals, amplified in a magnetic amplifier F, actuates an electro-mechanical device G which steers the hydraulic servomotor H and displaces its movable output member H' in such direction as to bring the group back to the predetermined normal conditions.

When at the output member H' of the servomotor H there is mechanically connected a voltage-generating device I in such a manner that its mobile part effects displacements proportional to the strokes of the servomotor, then at the output of the generator I there appears a signal proportional at any time to the speed of displacement of the servomotor $$\frac{ds}{dt}$$

The generator may be a common direct current rotary generator, connected with the rod of the servomotor for instance by a rack, or a mobile bobbin placed in the magnetic field and connected in suitable manner with said rod, but in practice, to avoid the inconveniences coming from the use of those devices, in practical embodiments the generating device is to be used as disclosed in my co-pending patent application hereinbefore referred to, and affording the advantages set forth therein.

With the connection of the generating device I the governing characteristics become different from those above described, since now from the mixer D there issues a signal proportional at all times to the sum of the magnitudes $$\Delta f + \frac{d(\Delta f)}{dt} - \frac{ds}{dt}$$

where the last term has negative sign, since the signal $$\frac{ds}{dt}$$

is applied to the mixer D in such a manner as to oppose the displacement of the servomotor H.

As already mentioned, the description has been made by way of example and it does not limit the generality of use of the governor according to the invention. In the case cited, a hydraulic turbine was involved, but it is clear that the same advantages coming from the present invention may be obtained if controlling a motive member of any other kind.

The same can be said of the governing magnitudes: in lieu of the frequency signal there may be employed, as a governing magnitude, another function, for instance power, phase, range, etc. or there may be employed more than one of those magnitudes acting contemporaneously, always attaining particular governing characteristics, given by the direct control of the speed to be governed and not attainable otherwise.

Figure 2:
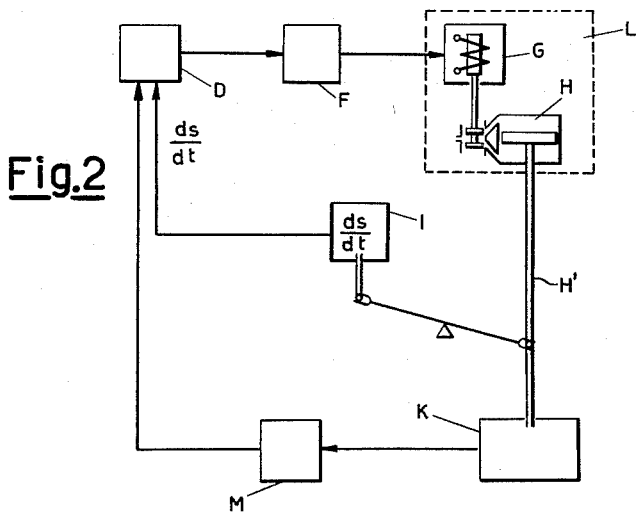
Fig. 2 is a block-diagram showing the principle of the present invention.

Hence the governor according to the present invention can be represented in a general manner as indicated in a simplified block-diagram in Fig. 2.

This generic diagram is provided for the only purpose of rendering the description more fully understood, while the number and kind of the individual elements shown in the drawing are by no means binding.

As visible in the diagram, a system K to be governed is controlled, through a mechanical power member L, for instance a hydraulic servomotor, by an electric governor in function of the governing magnitudes such as frequency, acceleration, power, phase, etc., in which the members sensitive to said magnitudes and which translate them into respective electric signals, may be known per se and are indicated in the diagram with the reference M.

The other elements of the governor are the same as described with reference to Fig. 1 and carry the same references.

I claim:

1. An apparatus for governing a variable of a system, comprising a mechanical power control means having an output member which is movable to control the variable of the system, a first generator connected to said system for generating a first electrical signal proportional to said variable of the system, means connecting said first generator to said power control means to impress said first electrical signal thereon for operating said power control means, a second generator connected to said output member and operable thereby to generate a second electrical signal proportional to the speed of movement of said output member, and means connecting the second generator to the power control means to impress said second signal thereon, said second signal tending to oppose the signal of the first generator for controlling the operation of said power control means.

2. An apparatus for governing the speed of a system, comprising a mechanical power control means having an output member which is movable to control the speed of said system, means connected to said system for generating an electrical voltage, the amplitude of which is proportional to the speed of the system, means operatively connecting said generator to said power control means, a device operatively connected to said output member to generate a voltage, the amplitude of which is proportional to the speed of movement of said output member, and means connecting said device to said power control means to oppose the voltage of said generator.

3. An apparatus for governing the speed of a system, comprising a mechanical power control means having an output member which is movable to control the speed of said system, a generator connected to said system for generating a signal in accordance with the speed of the system, means operatively connecting said generator to said power control means, a device operatively connected to said output member to generate a signal which is proportional to the acceleration of said output member, and means connecting said device to said power control means to oppose the signal of said generator.

4. An apparatus according to claim 3 wherein the system comprises a turbine.

5. An apparatus according to claim 3 wherein means are operatively connected to the output of said generator for converting the electrical signal of said generator to provide a signal which is proportional to the acceleration of the system, and which is operatively connected to said power control means.

6. An apparatus according to claim 5 wherein the signal of said device and the derived acceleration signal of the generator are connected to a mixer which causes the amplitude difference of the two signals to operate said power control means.

7. An electric speed control device for controlling a variable speed power source comprising a first generator driven by said source to generate a first voltage with an amplitude proportional to the speed of said source, a governor, a movable member connected to said governor to be actuated thereby to control the speed of operation of said power source, a second generator, means connecting said second generator to said movable member to operate said second generator to generate a second voltage of amplitude proportional at all times to the speed of movement of said movable member, and a mixer to add algebraically voltages generated by said first and second generators, said mixer connecting said first and second generators to said governor to actuate the same.

References Cited in the file of this patent

UNITED STATES PATENTS

| | | |
|---|---|---|
| 2,781,743 | Mann et al. | Feb. 19, 1957 |
| 2,790,090 | Hinde et al. | Apr. 23, 1957 |